(12) United States Patent
Hasegawa et al.

(10) Patent No.: US 6,769,707 B2
(45) Date of Patent: Aug. 3, 2004

(54) STEERING DAMPER APPARATUS

(75) Inventors: Yosuke Hasegawa, Saitama (JP); Takeyasu Itabashi, Saitama (JP); Kanji Hayashi, Saitama (JP); Takeshi Wakabayashi, Saitama (JP); Osamu Bunya, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 14 days.

(21) Appl. No.: 10/231,229

(22) Filed: Aug. 30, 2002

(65) Prior Publication Data

US 2003/0047904 A1 Mar. 13, 2003

(30) Foreign Application Priority Data

Sep. 7, 2001 (JP) ...................................... 2001-272568

(51) Int. Cl.[7] .............................................. B62K 21/08
(52) U.S. Cl. ..................................................... 280/272
(58) Field of Search ................................ 280/272–275, 280/283, 90, 270, 263; 180/417; 188/290, 306, 307, 267.2, 276, 296; 74/551.2, 551.8

(56) References Cited

U.S. PATENT DOCUMENTS

| | | | | |
|---|---|---|---|---|
| 3,107,752 A | * | 10/1963 | McLean ...................... | 188/276 |
| 4,768,630 A | * | 9/1988 | Aubry et al. ............... | 188/290 |
| 4,773,514 A | | 9/1988 | Gustafsson | |
| 5,836,213 A | * | 11/1998 | Hopey ........................ | 74/551.2 |
| 2002/0152832 A1 | * | 10/2002 | Hasegawa et al. .......... | 74/551.8 |
| 2002/0157909 A1 | * | 10/2002 | Hasegawa et al. .......... | 188/290 |
| 2003/0234508 A1 | * | 12/2003 | Hanawa et al. ............. | 280/272 |

FOREIGN PATENT DOCUMENTS

| | | | | |
|---|---|---|---|---|
| EP | 1318069 A2 | * | 6/2003 | ........... B62K/21/08 |
| JP | 63-11492 A | | 1/1988 | |
| JP | 63-64888 A | * | 3/1988 | |
| JP | 2001099208 A | * | 4/2001 | ............. F16F/9/14 |
| JP | 2002302085 A | * | 10/2002 | ........... B62K/21/08 |
| JP | 2003081171 A | * | 3/2003 | ........... B62K/21/08 |

* cited by examiner

*Primary Examiner*—Lesley D. Morris
*Assistant Examiner*—Daniel Yeagley
(74) *Attorney, Agent, or Firm*—Birch, Stewart, Kolasch & Birch, LLP

(57) ABSTRACT

In a steering damper utilizing hydraulic pressure, even if generation of a damping force is controlled in correspondence with an external force inputted to a handle upon external perturbations and the like, the damping force changes due to change in liquid temperature of working liquid. Accordingly, to precisely control the damping force, correction based on change in liquid temperature of the working liquid is required. However, to measure the change in liquid temperature of the working liquid, it is necessary to provide a particular measurement device requiring a complicated structure, which increases the number of parts and costs. Accordingly, the present invention has an object to provide a steering damper which can easily temperature-correct the damping force without such difficulty. A liquid chamber is provided in a main body of a steering damper. An inside of the liquid chamber is partitioned into a right liquid chamber and a left liquid chamber by a rotatable partition wall integral with a shaft coaxial with a steering shaft. Both liquid chambers are connected with each other by a liquid passage, and a control valve is provided in the middle of the passage such that the damping force is variable. A control device drive-controls the control valve in correspondence with a turning angle speed of the shaft and the partition wall, thereby controls the damping force, and corrects the damping force based on intake temperature information detected by an intake temperature sensor.

19 Claims, 6 Drawing Sheets

STEERING DAMPER APPARATUS

CROSS-REFERENCE TO RELATED APPLICATIONS

This application claims priority under 35 U.S.C. § 119 on Application No. 2001-272568, filed in Japan on Sep. 7, 2001.

BACKGROUND OF THE INVENTION

1. Field of the Invention

The present invention relates to a hydraulic steering damper apparatus for a motorcycle used for suppressing the oscillation of a handle upon running. More particularly, the present invention relates to an apparatus which produces a variable damping force.

2. Description of Background Art

To prevent the oscillation of handle due to kick-back upon external perturbations, a hydraulic steering damper apparatus which produces a damping force to the oscillation is known (as an example, Japanese Patent No. 2593461). Furthermore, an apparatus for producing a variable damping force arranged to produce a damping force only when necessary, while not to produce the damping force in other cases, is known. For example, an apparatus which performs control based on a steering angle and a running speed (Japanese Published Unexamined Patent Application No. Sho 63-64888) and an apparatus which performs control based on a change in load on a front wheel (Japanese Published Examined Patent Application No. Hei 7-74023) are known.

In the steering damper utilizing hydraulic pressure as described above, even if generation of a damping force is controlled in correspondence with an external force inputted to the handle upon external perturbations and the like, the damping force changes due to a change in temperature of a working liquid. Accordingly, to precisely control the damping force, correction based on a change in temperature of the working liquid is required. However, any hydraulic steering damper in consideration of such correction has not been known. Furthermore, to measure the change in liquid temperature of the working liquid, it is necessary to provide a measurement device requiring a complicated structure, which increases the number of parts and costs.

SUMMARY OF THE INVENTION

Accordingly, the present invention has an object to provide a steering damper which can easily temperature-correct the damping force without such difficulty.

To solve the above problem, according to a first aspect of the present invention, a steering damper in a hydraulic steering damper apparatus applies a variable damping force to a rotation operation of a front wheel steering system supported by a vehicle body front part, wherein a value of said damping force is corrected based on a temperature measured by a temperature sensor provided in a predetermined position of said vehicle body.

According to a second aspect of the present invention said temperature sensor is provided for measurement of intake air temperature around an intake device.

According to the first aspect of the present invention, the damping force can be temperature-controlled based on the temperature measured by the temperature sensor provided in the predetermined position of the vehicle body. Therefore, the damping force can be corrected in correspondence with temperature change of the working liquid. Accordingly, the damping force can correspond more appropriately to an actual temperature.

In addition, the amount of heat generation of the steering damper itself is small, and the liquid temperature of the working liquid can be predicted from surrounding temperature outside the steering damper. Accordingly, the liquid temperature of the working liquid in the steering damper is not directly measured but the temperature measured by the temperature sensor provided in a different place from that of the steering damper in the vehicle body can be used. Accordingly, a complicated particular measurement device can be omitted, and the temperature detection can be simplified.

According to the second aspect of the present invention, the intake temperature sensor which is indispensable in, e.g. an electronic fuel injection system is utilized and its temperature information is used. Accordingly, any special temperature sensor for steering damper is not necessary. This improves the efficiency of use of parts, and reduces the number of parts and costs.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinbelow, a first working example will be described with reference to the accompanying drawings.

Figure 1:
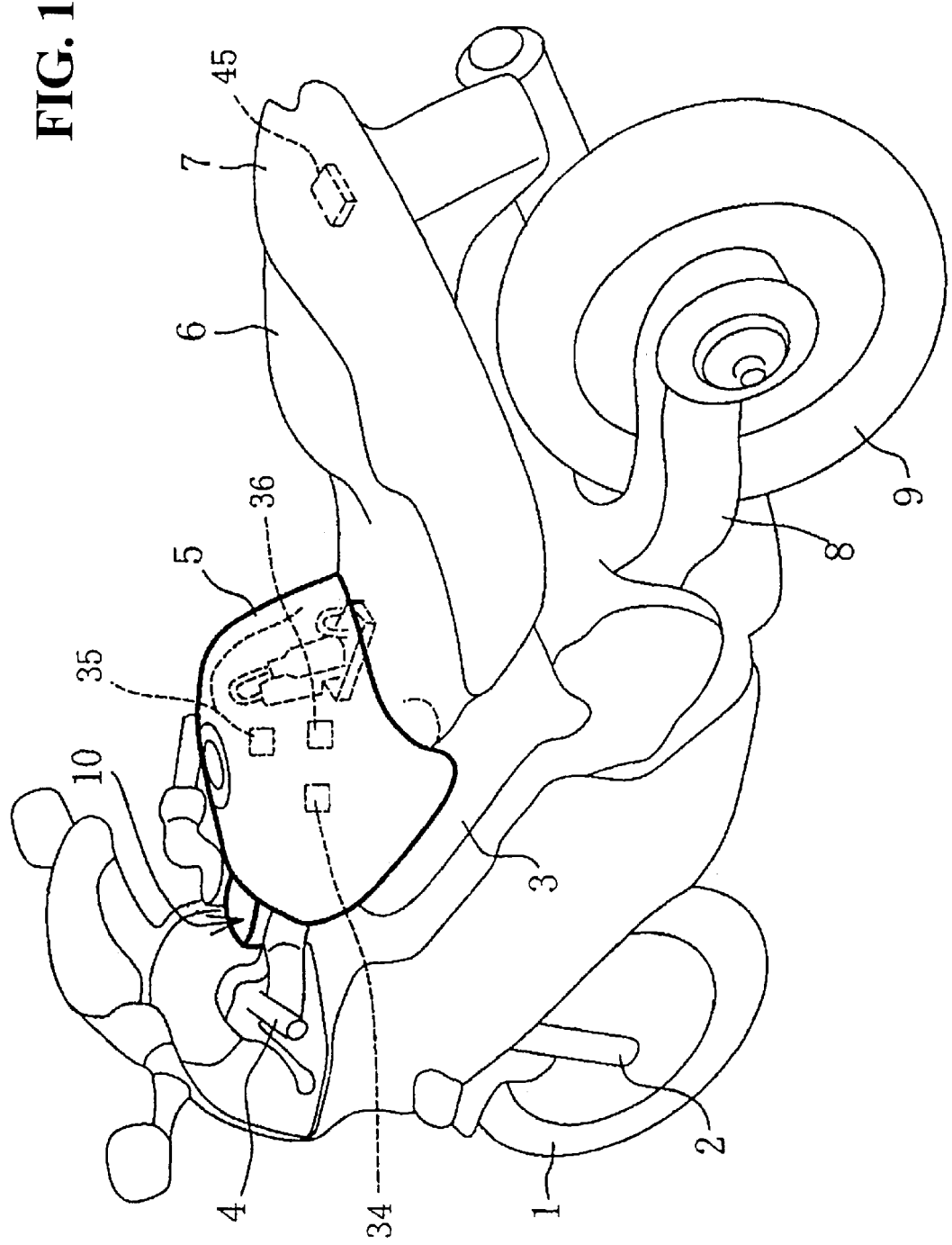
FIG. 1 is a perspective view of motorcycle to which the present embodiment is applied.

In FIG. 1, an upper part of a front fork 2 supports a front wheel 1 at its lower end. The front fork 2 is coupled to a front part of a vehicle body frame 3 and is rotatable by a handle 4. A fuel tank 5 is supported on the vehicle body frame 3. Reference numeral 6 identifies a seat. Reference numeral 7 identifies a rear cowl. Reference numeral 8 identifies a rear swing arm and reference numeral 9 identifies a rear wheel.

Figure 2:
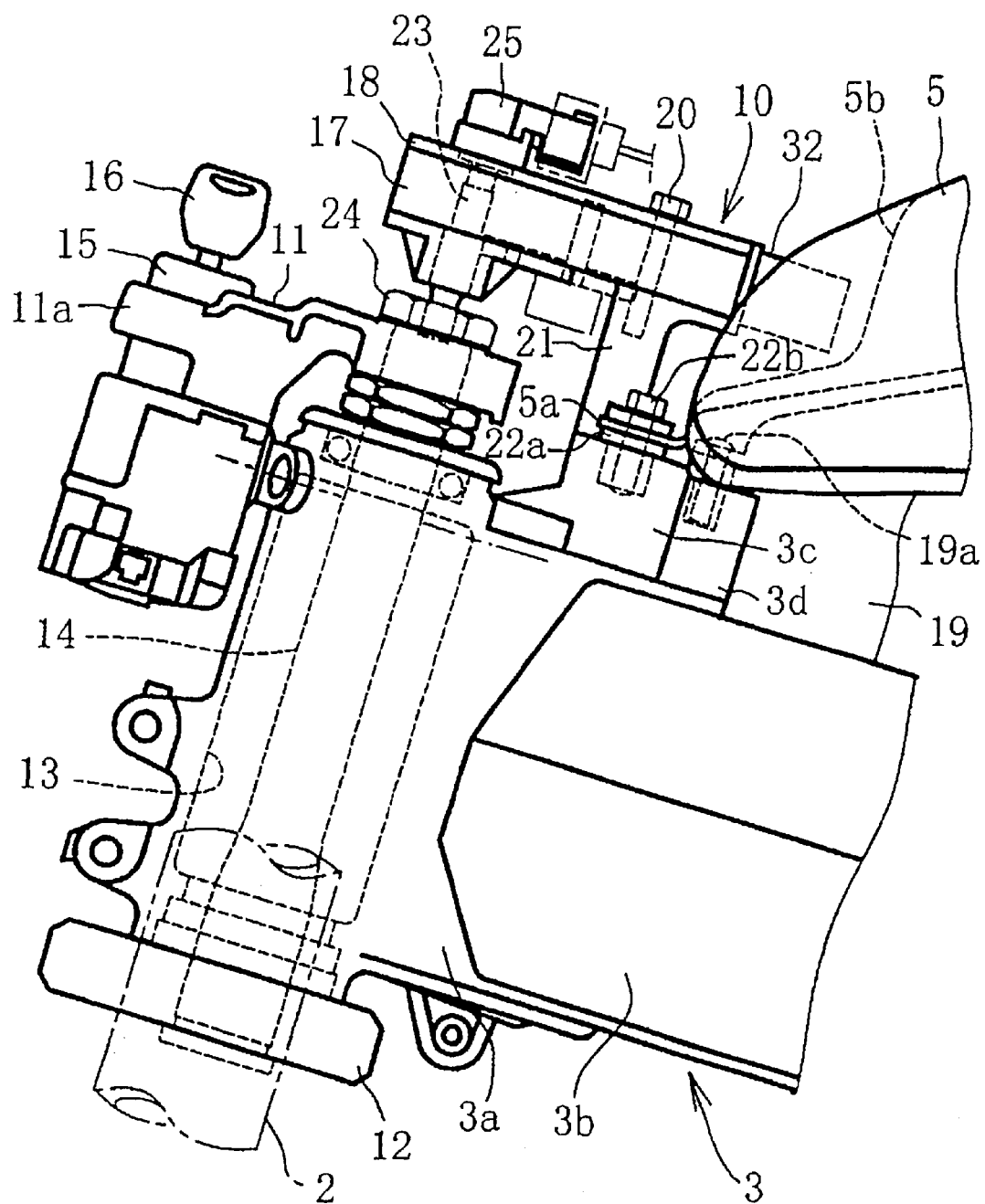
FIG. 2 is a side view of the vehicle front part showing the steering damper device portion.
Figure 3:
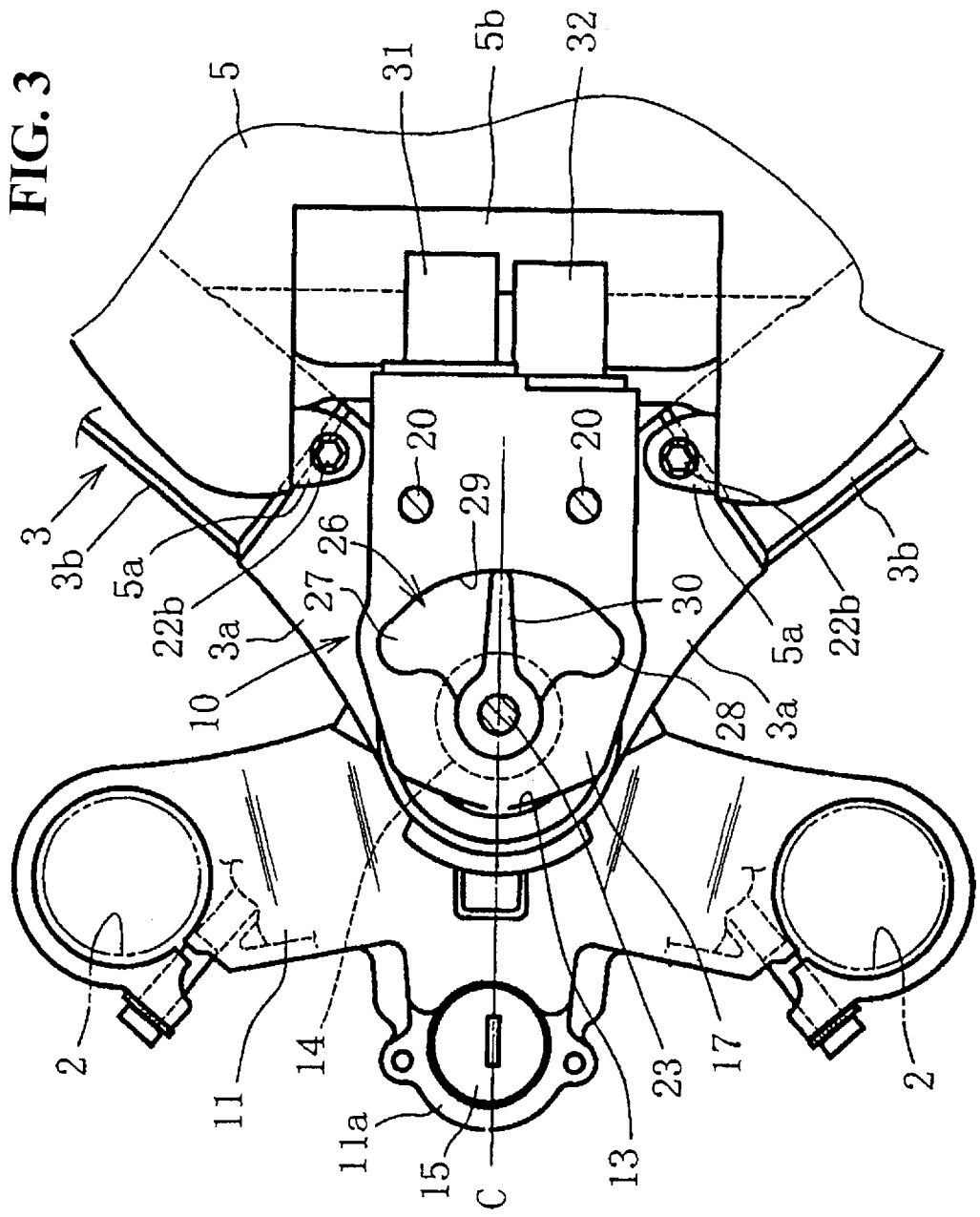
FIG. 3 is a plan view of the above portion of FIG. 2.

The steering damper will be now described. As shown in FIGS. 2 and 3, a steering damper 10 is provided between a top bridge 11 to which the handle 4 is attached and a head 3a as a front end of the vehicle body frame 3. The top bridge 11 is integrated with a bottom bridge 12 in a lower position in pair, holding a steering shaft 14 supported by a head pipe 13 therebetween. The top bridge 11 and bottom bridge 12 and the steering shaft 14 integrally rotate.

Respective upper parts of pair of left and right front forks 2 are supported by the top bridge 11 and the bottom bridge 12. The head pipe 13 is a pipe-shaped part integrally formed with the head 3a of the vehicle body frame 3. It should be noted that the vehicle body frame 3 includes the head 3a and a main frame 3b as a pair of left and right parts extending leftward and rearward and rightward and rearward from left and right positions of the rear end of the head (FIG. 3). A stay 11a projects frontward and is provided integrally with a front central portion of the top bridge 11. A main switch 15 is integral with a handle lock and is supported at the stay 11a. The main switch 15 is turned ON/OFF and unlocked by a key 16.

The steering damper 10 of the present embodiment is a hydraulic damper to prevent kick back. The steering damper 10 includes a main body 17 and a lid 18 (FIG. 2). A rear side of the steering damper is fastened to a boss 21, projecting above and integrally formed with an upper surface of the head 3a of the vehicle body frame 3 around the head pipe 13, by a bolt 20. At this time, the main body 17 and the lid 18 are integrated by fastening. The boss 21 is previously provided with a nut.

A step 3c, which is one-level higher is formed in a rear upper surface of the head 3a in left and right positions of the boss 21. A stay 5a is formed in left and right positions in a front end of the fuel tank 5 and is attached here via rubber member 22a by a bolt 22b in vibration proof status. The stay 5a projects toward the vehicle body central side from both sides of a front end of a concave member 5b opened frontward and upward at a front center of the fuel tank 5. The stay 5a overlaps with the step 3c around a position where the front end of the main frame 3b is connected.

An air cleaner 19 is provided under the fuel tank 5. A front end of the air cleaner 19 is attached to an attachment member 3d at a rear end of the head 3a by a bolt 19a in a position below the concave member 5b. The attachment member 3d projects continuously from the step 3c rearward and toward a position below the concave member 5b (FIG. 2).

A shaft 23 is provided having an axial line directed upward and downward in FIG. 2 through a front part of the steering damper 10. A lower end of the shaft 23 projects downward from a main body 17 of the steering damper 10 and is engaged with an upper end of the steering shaft 14, and integrally rotatably coupled thereto. A shaft 23 is provided coaxially with the steering shaft 14. Numeral 24 is a steering nut, which fastens the upper end of the steering shaft 14 to the top bridge 11. The lower end of the shaft 23 passes through a hole formed in a central portion of the steering nut 24.

The upper part side of the shaft 23 passes upward through the lid 18. An upper end of the shaft 23 enters a turning angle sensor 25 fixed on the lid 18. The turning angle sensor 25 is a well-known sensor using an electric resistor or the like. The sensor detects a turning angle of relative rotation of the shaft 23 to the main body 17 of the steering damper 10, thereby detects a turning angle of the steering shaft 14 which integrally rotates with the shaft 23, and outputs a detection signal to a control device to be described later.

The steering damper 10 in FIG. 3 shows the structure on the main body 17 side except the lid 18. Reference numeral 26 identifies an approximately sector-shaped liquid chamber formed by a concave member provided in the main body 17; reference numeral 27 identifies a right liquid chamber; reference numeral 28 identifies a left liquid chamber; Reference numeral 30 identifies a partition wall separating the left and right liquid chambers with one end integrated with the shaft 23 to rotate integrally with the shaft 23; reference numeral 31 identifies a control valve; and reference numeral 32 identifies the above-described control device.

It should be noted that the steering lock 15, the steering shaft 14 and the shaft 23 are positioned on approximately the same straight line to a vehicle body center line C. The steering lock 15, the control valve 31 and the control device 32 are positioned on opposite sides in frontward and rearward directions with the steering damper 10 therebetween. The control valve 31 and the control device 32 are provided in left and right positions with the vehicle body center line C therebetween, and the control valve 31 and the control device 32 are attached to a rear part of the main body 17.

Figure 4:
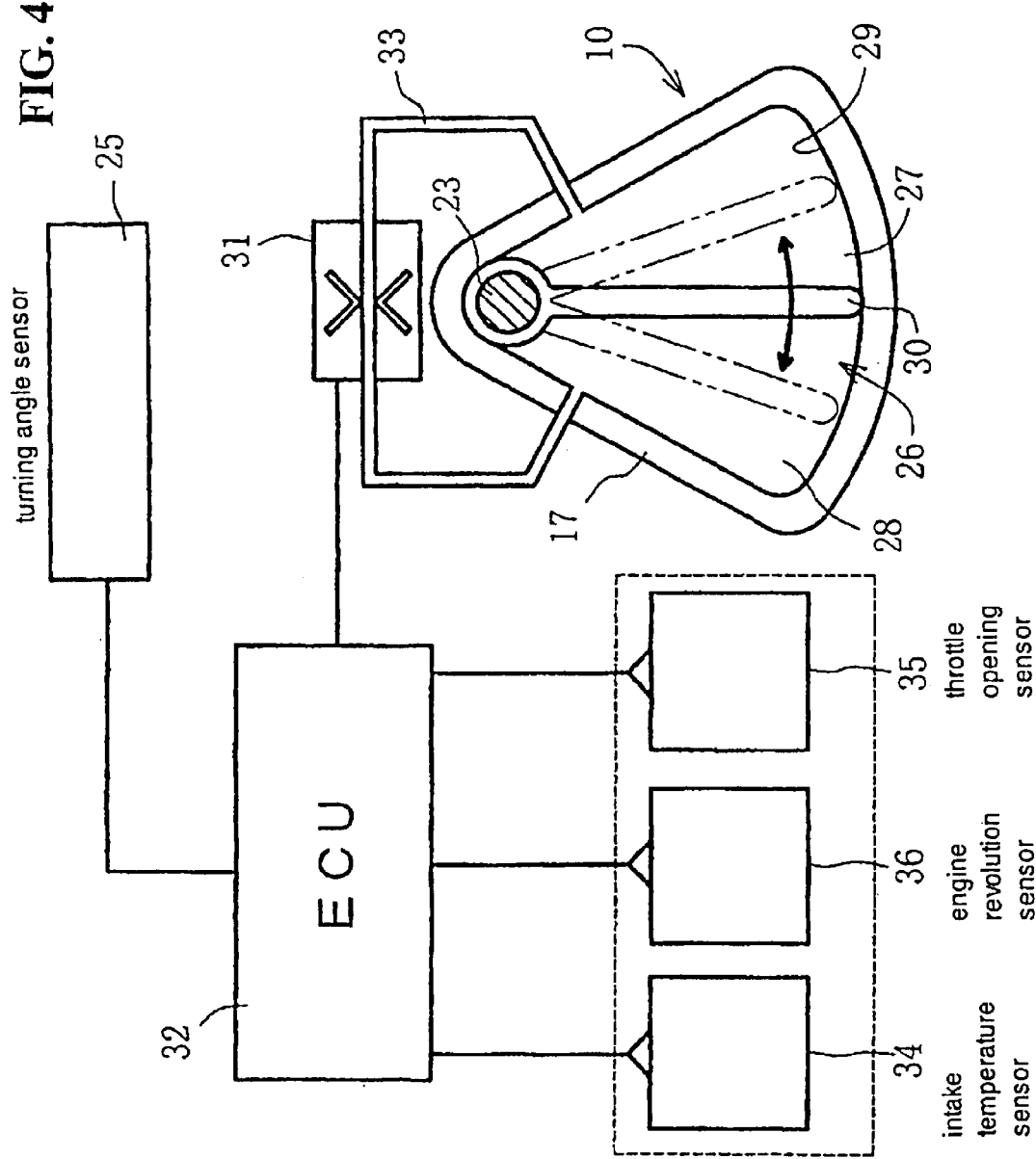
FIG. 4 is a diagram showing the schematic structure of the steering damper.

FIG. 4 schematically shows the structure of the steering damper 10. It should be noted that the figure is provided for explanation of principle, and for the sake of explanation, the arrangement of the control valve 31, the control device 32 and a liquid passage shown in this figure to be described later are opposite to the actual arrangement in FIG. 3, i.e., on the vehicle body front side to the liquid chamber 26. In this figure, in the steering damper 10, the sector-shaped liquid chamber 26 is provided expanding rearward. The shaft 23 is positioned in the pivotal point of the sector. The inside of the liquid chamber 26 is separated into two parts, the right liquid chamber 27 and the left liquid chamber 28 by the partition wall 30 extending rearward in shape of wing integrally with the shaft 23.

An end of the partition wall 30 has a slide surface, which rotates along an inner surface of an arc wall 29 of the liquid chamber 26. The right liquid chamber 27 and the left liquid chamber 28 are filled with non-compressive type liquid such as oil, and are in communication with each other via a liquid passage 33. Accordingly, when the front wheel performs an oscillation leftward and rightward, the working liquid moves from one liquid chamber, where the capacity is reduced by rotation of the partition wall 30 interlocked with the front wheel via the steering shaft 14 and the shaft 23 (phantom line in FIG. 3), through the liquid passage 33, to the opposite expanded liquid chamber in correspondence with the change in capacity of the liquid chamber.

A control valve 31 is provided in a middle part of the liquid passage 33. The control valve 31 has a variable throttle passage to cause a damping force. By this arrangement, a variable damping force can be generated by limiting the liquid movement of the working liquid in accordance with change in capacity between the above-described left and right liquid chambers, by changing a cross-sectional area of the throttle passage. In the present embodiment, a linear solenoid which linearly moves a driving member thereof is used.

The throttle of the control valve 31 is controlled by the control device 32. The control device 32, comprising an ECU or the like, calculates a turning angle speed by differentiating a turning angle based on the detection signal from the turning angle sensor 25 by time, and controls the damping force to an appropriate value by changing the throttle of the control valve 31 in correspondence with the turning angle speed. Furthermore, as described later, the control device inputs respective detection signals from, e.g. an intake temperature sensor 34, a throttle opening sensor 35 and an engine revolution sensor 36 constructing a sensor group of an electronic fuel injection system as correction sensor signals, in accordance with necessity, and corrects the damping force.

Figure 5:
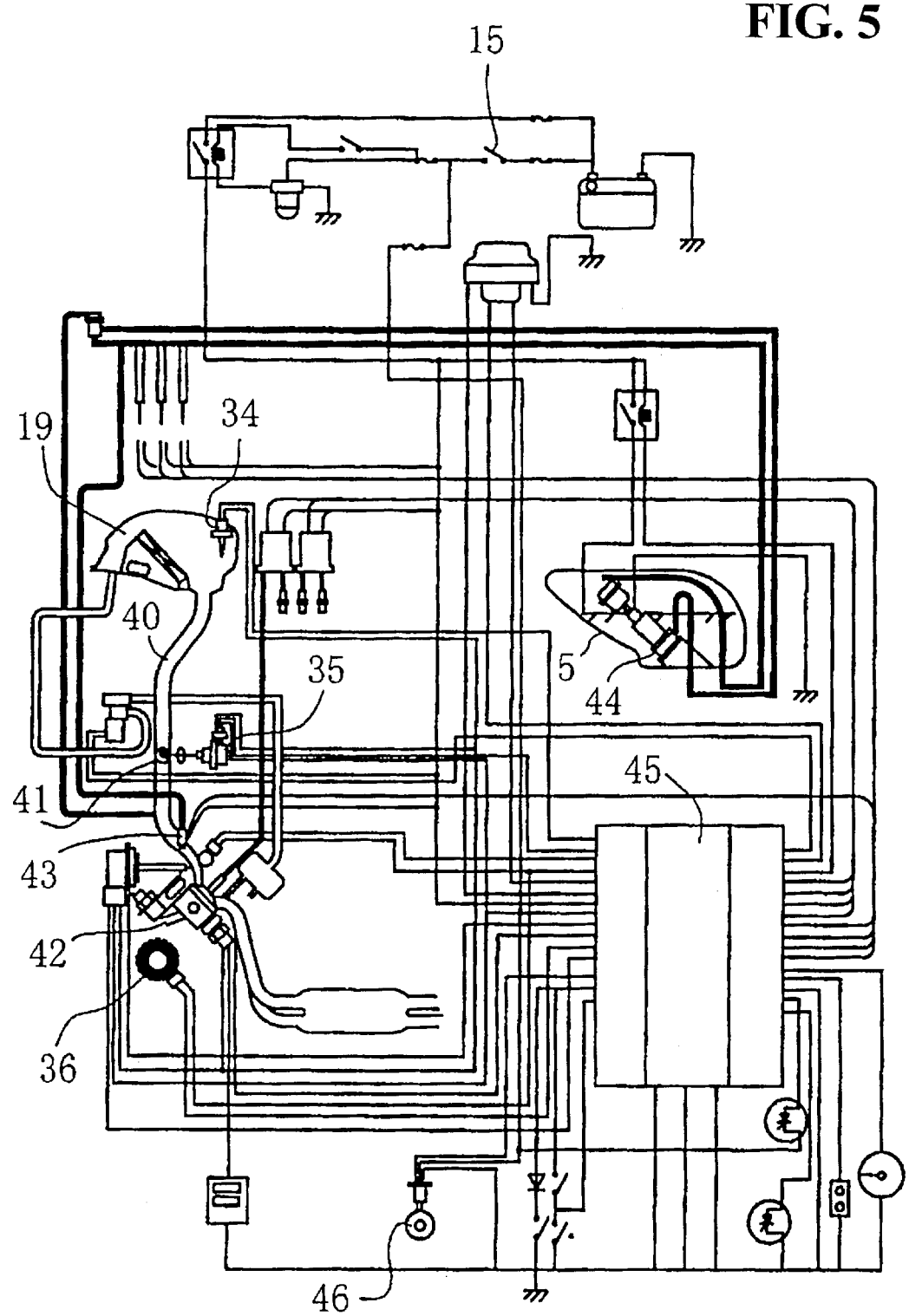
FIG. 5 is a constructional diagram of the electronic fuel injection system.

FIG. 5 is a constructional diagram of the fuel injection system. An intake air temperature is detected by the intake temperature sensor 34 provided around a connection portion between an exit of an air cleaner 19 and an intake passage 40. The throttle opening sensor 35 is provided in an intermediate portion of the intake passage 40 to detect an opening of a throttle valve 41. The engine revolution sensor 36 is provided around a crankshaft of the engine 42 for detection of the number of engine revolutions.

In the figure, reference numeral 43 denotes an injector for electronic fuel injection; reference numeral 44 identifies a fuel pump; reference numeral 45 identifies an ECU as a control device of the electronic fuel injection system; and reference numeral 46 identifies a vehicle body speed sensor.

Figure 6:
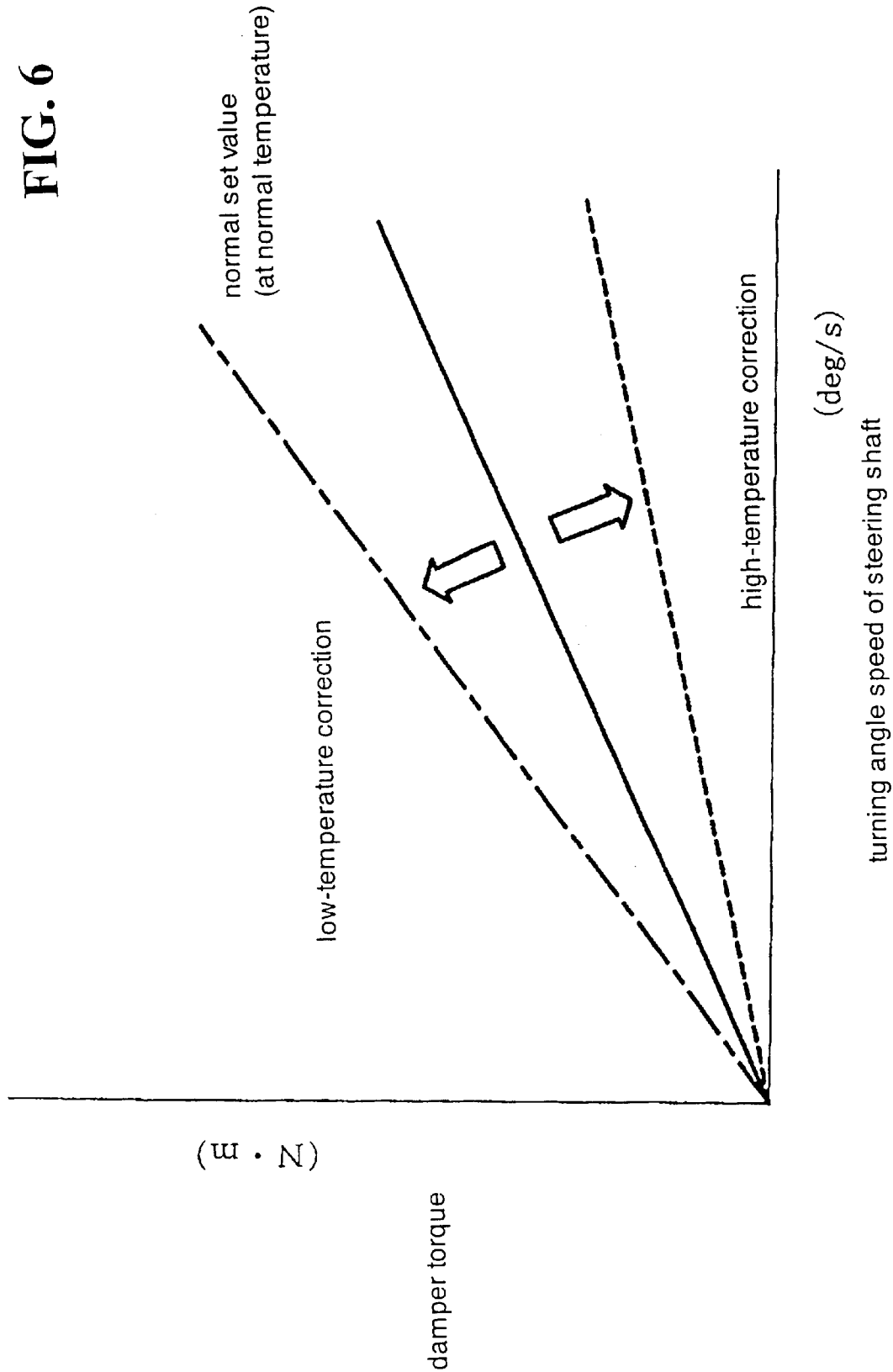
FIG. 6 is a graph showing the temperature correction method.

Operations of the present embodiment will now be described. Upon travel in a straight line, a rider holds the handle in a neutral position. However, when the front wheel 1 performs an oscillation due to a road surface condition, the control device 32 generates a damping force in proportional relation to the angle of oscillation from a normal set value as represented by a straight solid line in FIG. 6. FIG. 6 is a graph representing the turning angle speed of the steering shaft 14 on the horizontal axis while the damping force (damper torque) on the vertical axis, in which the normal set value represented by the solid line shows the turning angle speed of the steering shaft 14 and the value of damping force to be generated in the steering damper 10 when the working liquid of the steering damper 10 is at a reference temperature (e.g., a normal temperature).

Accordingly, when the turning angle speed of the steering shaft 14 is small, a small damping force is generated to attain agile handle operation. As the turning angle speed of the steering shaft 14 increases, a greater damping force is generated to appropriately regulate the rotation of the partition wall 30, further appropriately regulate the rotation of the steering shaft 14 via the shaft 23, and thereby effectively prevent kick back.

Furthermore, when the temperature of the working liquid changes, the concentration also changes. Accordingly, even in the liquid movement amount of the same volume, the frequency of generation of the damping force differs depending on the temperature of the working liquid. When the temperature of the working liquid is higher than the reference temperature, a high-temperature correction line having a slope less than the normal set value, as represented by a broken line in FIG. 6, is used so as to reduce the frequency of generation of a damping force with respect to the turning angle speed. Accordingly, correction can be made to an appropriate value so as to actually attain the same damping force generated at the reference temperature.

When the temperature of the working liquid is lower than the reference temperature, a low-temperature correction line having a slope greater than the normal set value, as represented by an alternate long and short dashed line in FIG. 6, is used so as to appropriately correct the damping force. In this manner, the damping force can be corrected in correspondence with temperature change of the working liquid. Accordingly, an appropriate damping force can always be generated regardless of the temperature change of the working liquid.

This temperature correction is performed based on the temperature detected by the intake temperature sensor 34. That is, if the temperature detected by the intake temperature sensor 34 is shifted to a value higher or lower than the reference temperature, the control device 32 calculates an appropriate damping force by using one of the above-described high-temperature and low-temperature correction lines and drive-controls the control valve 31.

At this time, the degree of heat generation by the steering damper 10 itself is negligible. Accordingly, the temperature of the working liquid can be estimated as about the same as the atmospheric temperature, and the atmospheric temperature can be regarded as similar to the intake air temperature detected by the intake temperature sensor 34. Accordingly, the temperature detected by the intake temperature sensor 34 can be utilized as the temperature of the working liquid. The liquid temperature of the working liquid in the steering damper 10 is not directly measured but the temperature measured by the temperature sensor 34, provided around the connection portion between the air cleaner 19 and the intake passage 40 on the downstream in a position different from that of the steering damper 10 in the vehicle body, can be used. Accordingly, complicated particular measurement means can be omitted and the temperature detection can be simplified.

Furthermore, the intake temperature sensor 34 is an indispensable constituent sensor in the electronic fuel injection system. Accordingly, by utilizing this sensor, a particular sensor for detection of working liquid temperature can be omitted and the efficiency of use of parts can be improved. Furthermore, the sensor structure in the hydraulic steering damper 10 can be simplified, and the number of parts and costs can be reduced.

It should be noted that further various corrections can be applied in addition to the above-described temperature correction. For example, if correction is performed based on a throttle opening speed obtained by differentiating the throttle opening detected by the throttle opening sensor 35 by time, the damping force can be corrected in correspondence with a change in acceleration of vehicle body. Furthermore, if the throttle opening is added to it, further precise correction can be made.

Furthermore, with the above-described throttle opening speed and throttle opening, the number of engine revolutions detected by the engine revolution sensor 36 can be applied. In addition, a gear position signal detected by a gear position switch (not shown) can be applied. This enables correction more precisely corresponding to actual running status.

It should be noted that the present invention is not limited to the above-described embodiments, but various modifications and applications can be made within the same principle of the present invention. For example, any other temperature sensor than the intake temperature sensor 34 may be used as long as it is provided on the vehicle body outside the steering damper 10. Furthermore, even if the intake temperature sensor 34 is utilized, the intake device provided around it is not necessarily the electronic fuel injection system but may be a natural intake type device such as a carburetor.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A hydraulic steering damper apparatus which applies a damping force to a rotation operation of a front wheel steering system supported by a vehicle body front part and which produces the damping force as a variable force, wherein a value of said damping force is corrected based on a temperature measured by a temperature sensor provided in a predetermined position of the vehicle body.

2. The hydraulic steering damper apparatus according to claim 1, wherein said temperature sensor is provided for measurement of intake air temperature around an intake device.

3. The hydraulic steering damper apparatus according to claim 1, wherein when the measured temperature is higher than a reference temperature, a high-temperature correction line having a slope less than a normal set value is used so as to reduce a frequency of generation of the damping force with respect to a turning angle speed.

4. The hydraulic steering damper apparatus according to claim 1, wherein when the measured temperature is lower than a reference temperature, a low-temperature correction line having a slope greater than a normal set value is used so as to increase a frequency of generation of the damping force with respect to a turning angle speed.

5. The hydraulic steering damper apparatus according to claim 2, wherein when the measured temperature is higher than a reference temperature, a high-temperature correction line having a slope less than a normal set value is used so as to reduce a frequency of generation of the damping force with respect to a turning angle speed.

6. The hydraulic steering damper apparatus according to claim 2, wherein when the measured temperature is lower than a reference temperature, a low-temperature correction line having a slope greater than a normal set value is used so as to increase a frequency of generation of the damping force with respect to a turning angle speed.

7. A vehicle, comprising:
   a vehicle body frame;
   a front fork, said front fork supporting a front wheel at a lower end therof, said front fork being coupled to a front part of said vehicle body frame and rotatable by a handle; and
   a steering damper, said steering damper being provided between a top bridge to which the handle is attached and a front of said vehicle body frame, said top bridge being integrated with a bottom bridge, holding a steering shaft supported by a head pipe therebetween, said top bridge, said bottom bridge and the steering shaft being integrally rotatable, said steering damper applies a variable damping force to a rotation operation of said top bridge, said bottom bridge and said steering shaft,
   wherein a value of said damping force is corrected based on a temperature measured by a temperature sensor provided in a predetermined position of said vehicle body.

8. The vehicle according to claim 7, wherein said temperature sensor is provided for measurement of intake air temperature around an intake device.

9. The vehicle according to claim 7, wherein when the measured temperature is higher than a reference temperature, a high-temperature correction line having a slope less than a normal set value is used so as to reduce a frequency of generation of the damping force with respect to a turning angle speed.

10. The vehicle according to claim 7, wherein when the measured temperature is lower than a reference temperature, a low-temperature correction line having a slope greater than a normal set value is used so as to increase a frequency of generation of the damping force with respect to a turning angle speed.

11. The vehicle according to claim 8, wherein when the measured temperature is higher than a reference temperature, a high-temperature correction line having a slope less than a normal set value is used so as to reduce a frequency of generation of the damping force with respect to a turning angle speed.

12. The vehicle according to claim 8, wherein when the measured temperature is lower than a reference temperature, a low-temperature correction line having a slope greater than a normal set value is used so as to increase a frequency of generation of the damping force with respect to a turning angle speed.

13. The vehicle according to claim 7, wherein a rear side of said steering damper is fastened to a boss projecting above and integrally formed with an upper surface of said front of said vehicle body frame by a bolt, said steering damper further comprising a main body and a lid integrated together by fastening with said bolt.

14. A steering damper assembly for a vehicle, comprising:
   a steering damper, said steering damper being mounted between a top bridge and a front of a vehicle body frame of the vehicle, said top bridge being integrated with a bottom bridge, holding a steering shaft supported by a head pipe therebetween, said top bridge, said bottom bridge and the steering shaft being integrally rotatable, said steering damper applying a variable damping force to a rotation operation of said top bridge, said bottom bridge and said steering shaft,
   wherein a value of said damping force is corrected based on a temperature measured by a temperature sensor provided in a predetermined position of said vehicle body.

15. The steering damper assembly according to claim 14, wherein said temperature sensor is provided for measurement of intake air temperature around an intake device.

16. The steering damper assembly according to claim 14, wherein when the measured temperature is higher than a reference temperature, a high-temperature correction line having a slope less than a normal set value is used so as to reduce a frequency of generation of the damping force with respect to a turning angle speed.

17. The steering damper assembly according to claim 14, wherein when the measured temperature is lower than a reference temperature, a low-temperature correction line having a slope greater than a normal set value is used so as to increase a frequency of generation of the damping force with respect to a turning angle speed.

18. The steering damper assembly according to claim 15, wherein when the measured temperature is higher than a reference temperature, a high-temperature correction line having a slope less than a normal set value is used so as to reduce a frequency of generation of the damping force with respect to a turning angle speed.

19. The steering damper assembly according to claim 15, wherein when the measured temperature is lower than a reference temperature, a low-temperature correction line having a slope greater than a normal set value is used so as to increase a frequency of generation of the damping force with respect to a turning angle speed.

* * * * *